United States Patent Office 3,130,070
Patented Apr. 21, 1964

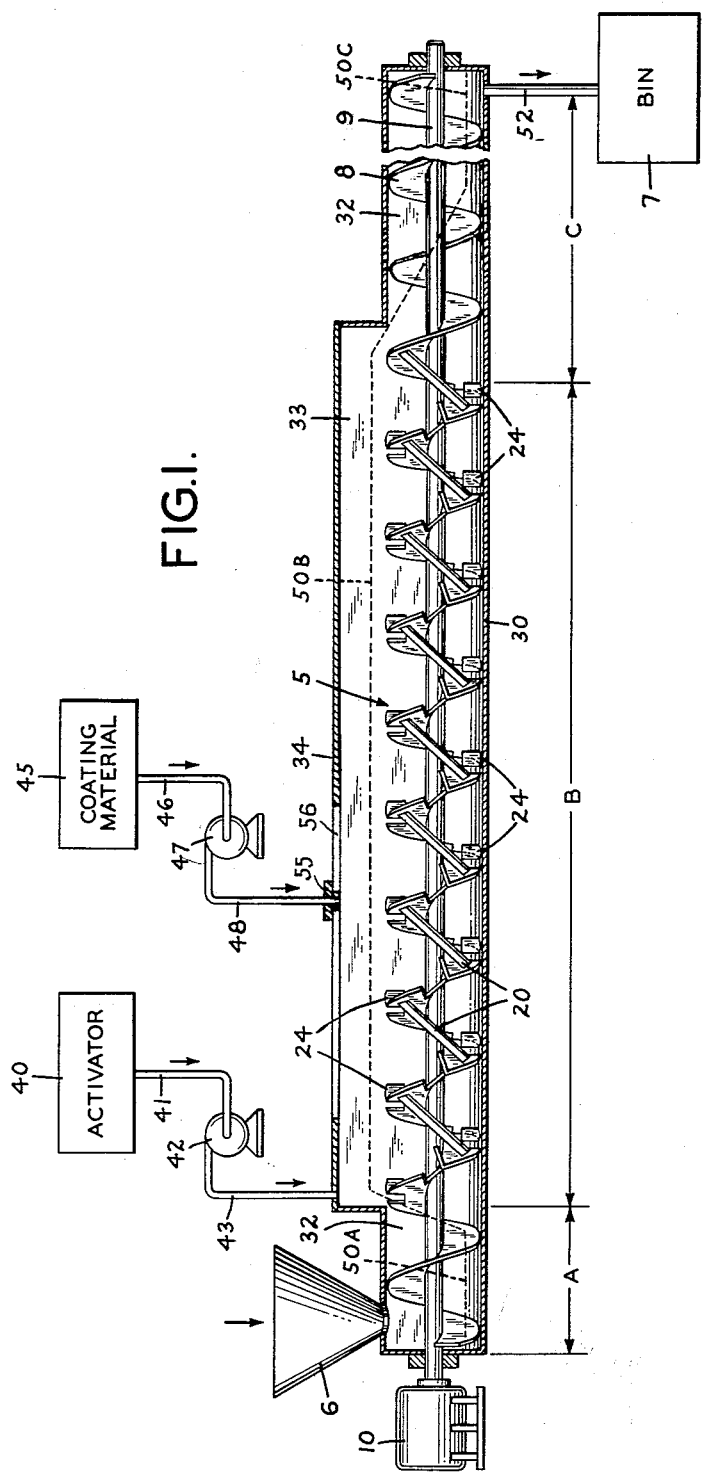

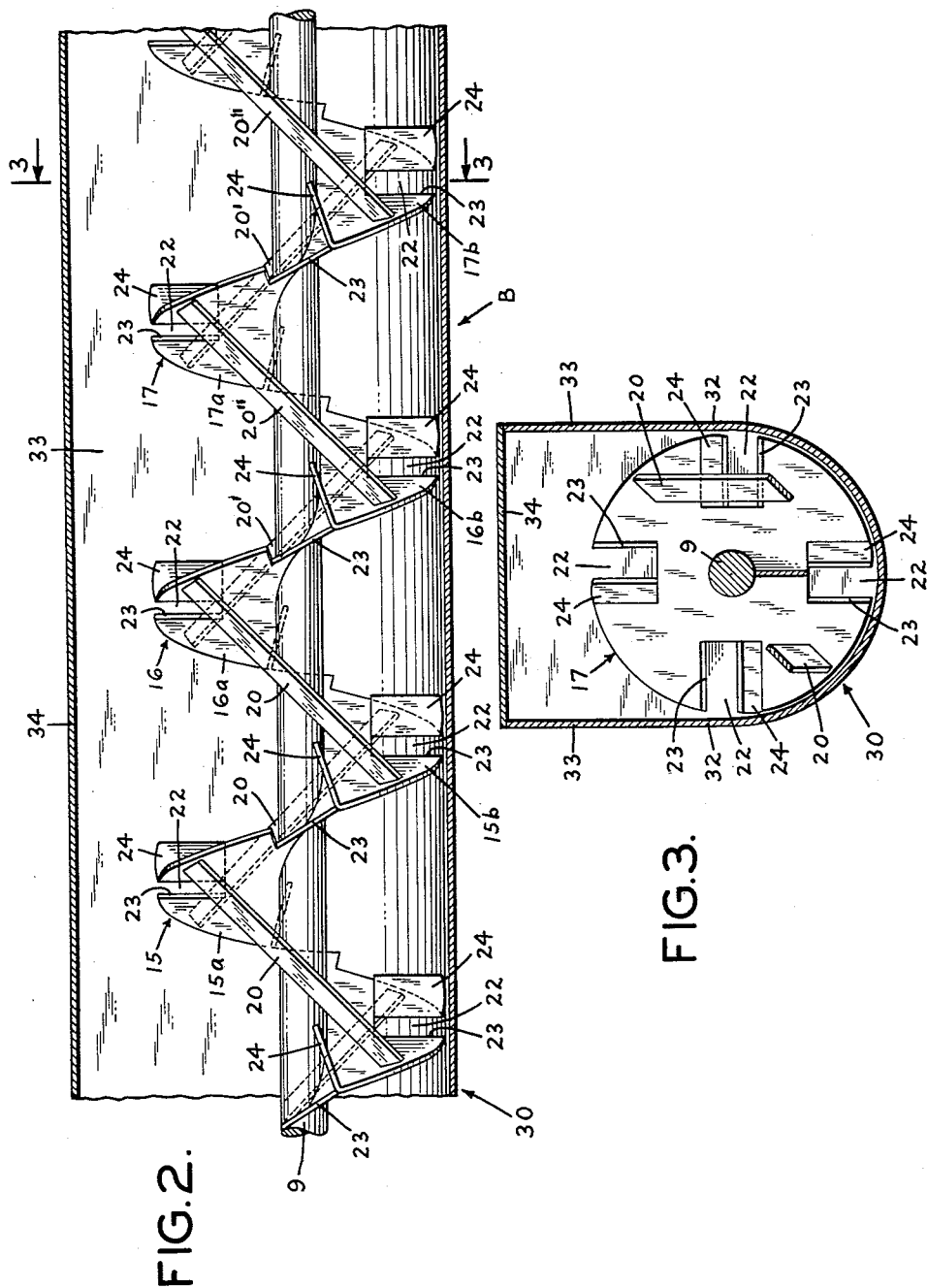

3,130,070
COATING METHOD AND APPARATUS
Robert Potters and Thomas K. Wood, both of Devon Road, Essex Fells, N.J.
Filed Aug. 10, 1960, Ser. No. 48,610
17 Claims. (Cl. 117—100)

This invention relates to a novel method and apparatus for treating discrete particles and more particularly to a novel method and apparatus for coating such particles as they are continuously advanced along a feed path.

The coating of discrete particles with various chemical agents has many industrial applications. As an illustration, it often is advantageous to provide a moisture-proof coating on glass beads of the type employed as reflectors for highways, curbings, road signs and other surfaces in order to prevent the beads from sticking together upon exposure to a relatively humid atmosphere. Such beads customarily have an average surface area per ounce of upwards of 50 square inches and range in diameter from about .125 inch down to 25 microns with an average diameter of around .020 inch. Particularly as a result of this relatively large surface area and small bead size, as well as the desirability of coating the beads in large quantities, the application of the coating material thereto is a relatively difficult operation.

Various methods and apparatus have been used heretofore in the application of a moisture-proof coating to glass beads or other discrete particles. Thus, in some cases, a batch of the particles has been placed in a closed vat or tank and treated with a silicone material as the moisture-proofing agent. Upon curing, the material adhered to each of the particles and provided a moisture-proof coating. Primarily because of the inability of such batch type systems to rapidly and economically coat discrete particles in large quantities, attempts have been made in recent years to coat the particles in a continuous process by spraying the silicone material thereon and then curing by the application of heat.

The prior methods and apparatus employed to form moisture-proof coatings of this type on glass beads or or other discrete particles have exhibited certain disadvantages. For example, it heretofore has been difficult to apply the coating material uniformly and evenly to each of the beads being treated, with the result that some of the beads were not sufficiently moisture-proof while others were coated with an excess of materials. In addition, particularly in prior methods and apparatus of the continuous type, variations in humidity conditions and other factors frequently necessitated the application of relatively high temperatures to the beads to adequately cure the coating material thereon. Furthermore, and this has been of special moment in cases where the coating has been applied in conjunction with the formation of the beads, difficulties were encountered in providing the desired degree of flexibility, and variations in the quantities and compositions of the coating materials employed and in the size and number of beads coated could not be realized without adversely affecting the efficiency of the coating operation.

One general object of this invention, therefore, is to provide a novel and economical method and apparatus for applying a coating to glass beads or other discrete particles as they are continuously advanced along a feed path.

More specifically, it is an object of this invention to provide such a method and apparatus wherein the coating material is uniformly and evenly applied to each of the particles being treated.

Another object of the invention is to provide a continuous process for efficiently and accurately coating discrete particles at room temperature.

Still another object of the invention is to provide a new and improved apparatus for coating dicsrete particles that is economical to manufacture and thoroughly reliable in operation In one illustrative embodiment of the invention, a mass of the particles to be coated is fed along a feed path by means of a helical screw conveyor of unique construction and arrangement. An aqueous activator solution is employed as a curing agent and is deposited on the particles as they are advanced, and the conveyor agitates the mass of particles to thoroughly mix the activator therewith. During this agitation, a silicone coating material is applied to the particles, and as the particles move along their path the material hardens and forms a uniform coating thereon.

In accordance with one feature of the invention the mass of particles is continuously advanced along its feed path during the coating operation in a manner such that large quantities of particles may be coated in a uniform and straight-forward manner.

In accordance with another feature of the invention, in certain particularly advantageous arrangements, the screw conveyor contains a relatively inefficient section of unique configuration which enables a thorough and complete mixing of the mass of particles with the coating material and the activator.

In accordance with a further feature of the invention, in certain good embodiments, the depth of the particle mass is increased as it is advanced along its path by the conveyor in a manner such that at least a major portion of the agitation of the particles takes place beneath their surface level. As a result, the deleterious effects of atmospheric humidity are maintained at a minimum while enabling a uniform and extremely thorough mixing of the particles with the various chemicals.

The present invention, as well as further objects and features thereof, will be understood more clearly and fully from the following description of a preferred embodiment thereof when read with reference to the accompanying drawings, in which:

FIGURE 1 is a diagrammatic view, partly in section, of an apparatus suitable for coating glass beads or other discrete particles in accordance with the invention;

FIGURE 2 is a longitudinal view, primarily in section, of a portion of the coating apparatus shown in FIGURE 1; and FIGURE 3 is a transverse sectional view taken along the line 3—3 in FIGURE 2.

Referring to FIGURE 1 of the drawings, there is shown an elongated, horizontally disposed screw conveyor 5 which is adapted to continuously feed a mass of glass beads or other discrete particles along a feed path defined thereby. The beads are introduced into the conveyor at one end thereof through a delivery hopper 6, while an outfeed bin 7 is disposed adjacent the opposite end of the conveyor for receiving the beads as they are discharged therefrom.

The conveyor 5 comprises an elongated, right hand screw 8 which is mounted on a shaft 9 and is driven at a uniform speed by a suitable power source, such as an electric motor 10 positioned at one end of the shaft, in a direction whereby the beads are advanced from left to right, as viewed in FIGURE 1. In the illustrated embodiment of the invention, the screw 8 is fabricated from a standard screw conveyor helix having a pitch equal to its outside diameter, although it will be understood that various other screws having other than the standard pitch and diameter relationship may be employed without departing from the spirit and scope of the invention.

The screw 8 includes an infeed section A, an intermediate, relatively inefficient section B and an outfeed section C in axial alignment with each other. Section A is disposed adjacent the delivery hopper 6 and is comparatively short, while sections B and C are each elongated. For purposes of convenience, the section C has been shown broken away in FIGURE 1.

The flights of the screw 8 in conveyor sections A and C are of conventional construction and include the usual smooth, continuous faces thereon. The screw flights in the intermediate section B, on the other hand, are modified as best shown in FIGURE 2. In this latter figure, three screw flights are respectively identified by the reference characters 15, 16 and 17 and include inlet faces 15a, 16a and 17a and outlet faces 15b, 16b and 17b. The screw flights 15, 16 and 17 are representative of all of the flights in conveyor section B and are provided with a series of elongated mixing bars 20 which advantageously are fabricated from flat bar stock. The ends of the bars 20 are welded or otherwise rigidly affixed adjacent the periphery of the flights at ninety degree intervals in a manner such that one of the bars interconnects the opposed inlet and outlet faces of each flight while another bar joins the opposed faces of each pair of adjacent flights. Thus, a mixing bar 20', for example, is affixed at one end to the outlet face 16b of the flight 16 and at its opposite end to the inlet face 16a of this flight, while another mixing bar 20" is secured at one of its ends to the outlet face 16b of flight 16 and at the other end to the inlet face 17a of flight 17. Similarly, another mixing bar 20' connects the opposed faces of flight 17, while another mixing bar 20" is affixed at one end to the outlet face 17b of flight 17 and at its opposite end to the inlet face of the next succeeding flight. The mixing bars are joined to the flight faces at substantially right angles thereto with the result that the bars on one side of the shaft 9 are inclined in an upward direction, as viewed in the drawings, while those on the opposite side thereof are inclined downwardly. In addition, each of the mixing bars is oriented with its widest transverse dimension substantially radial to the shaft.

As best shown in FIGURE 3, the flights of the screw 8 within section B additionally include a series of rectangular openings 22 which are spaced at 90 degree intervals around the periphery of the screw and are positioned midway between the mixing bar ends in contact with each flight. These openings are formed by making four L-shaped cuts 23 in each flight face and by bending the panels formed by the cuts toward the outlet side of the conveyor to form paddles 24. Each of the paddles 24 meets the flight face at approximately a right angle.

The screw 8 is mounted in an elongated trough 30 having side walls 32 extending upwardly on either side of the screw. The portions of the walls 32 within the section B preferably are provided with splash boards 33 which form upper extensions of these wall portions. In addition, a cover 34 serves to substantially enclose the trough 30.

The curing agent or activator for the silicone coating material to be applied to the glass beads or other discrete particles is supplied to the trough 30 from a suitable storage tank indicated schematically at 40 (FIGURE 1). A flexible hose 41 connects the tank 40 to the inlet side of a pump 42, while a second flexible hose 43 is connected between the pump outlet and the interior of the trough at the junction between the conveyor sections A and B. Although various materials which are by themselves well known to the art may be employed as the activator, a water soluble silicate solution, such as an aqueous solution of potassium silicate, sodium silicate, etc., or other aqueous alkaline solution is of particular effectiveness. The use of an aqueous solution is advantageous in that the water assists in the uniform distribution of the activator on the surface of each of the beads or other discrete particles to be coated and also serves to decrease the reaction time between the activator and the silicone coating material. In cases where the particles are made of glass or other hygroscopic substance, their affinity for the water in the solution further assists in the application of a uniform film of the activator over the entire particle surface.

The coating material is stored in a suitable tank 45 and is introduced into the trough 30 by a flexible hose 46, a pump 47 and a second flexible hose 48 which extends through the cover 34 and into the portion of the trough adjacent conveyor section B on the downstream side of the activator conduit 43. The ratio between the amount of coating material supplied to the trough and the activator in its aqueous solution illustratively may be about four to one. As will become more fully apparent hereafter, in certain advantageous embodiments the longitudinal spacing between the coating material hose 48 and the hose 43 for the activator is carefully controlled in accordance with variations in atmospheric humidity.

Any of the polymerizable silicones, such as the silanes or polysiloxanes which are capable of undergoing further polymerization, may be employed as the coating material. For example, suitable coating materials include the alkyl trihalosilanes, including methyltrichlorosilane, octadecyltrichlorosilane, cyclohexyltrichlorosilane, etc., alkenyl trihalosilanes, including allytrichlorosilane, vinyltrichlorosilane, etc., the aryl trihalosilanes, including phenyltrichlorosilane, etc., the alkyl alkoxysilanes, including methyltriothoxysilane, mono - methyl - diethoxysilane, etc., alkenyl alkoxysilanes, including vinyltricthoxysilane, etc., as well as any of the compositions formed by hydrolysis of these materials. The material preferably is one that may be admixed in liquid form with the particles to be coated. Gaseous silicone materials capable of forming moisture-resistant coatings may also be employed but are more troublesome to apply. Of themselves, the various polymerizable silicones useful as a coating material are well known and are not a part of this invention.

As indicated heretofore, the motor 10 is adapted to rotate the helical screw 8 at a uniform speed. The glass beads or other discrete particles to be coated are deposited in the trough 30 adjacent the conveyor section A by means of the infeed hopper 6 and are fed along the trough at a relatively rapid rate toward the comparatively inefficient conveyor section B. The beads being advanced by section A are disposed in the bottom portion of the trough at a level indicated by the dotted line 50A in FIGURE 1. As the beads reach section B, their rate of movement abruptly decreases as a result of the mixing bars 20, the openings 22 and the paddles 24 in this latter section. The beads in section B thereby rise to a level 50B and completely submerge the screw 8.

As the glass beads enter section B and build up to the level 50B, they come into contact with the activator solution as it is drawn into the trough 30 by the pump 42. At this time, as well as throughout their passage through section B, the mass of beads beneath level 50B are undergoing violent agitation as a result of the mixing bars 20, the openings 22 and the paddles 24, and the activator is uniformly distributed over the surface of each bead to fully sensitize the beads and condition them for the application of the coating material. In addition, primarily as a result of their particular orientation and arrangement, the mixing bars tend to impart a reversing component of force to the forward movement of the beads along the trough. In the illustrated embodiment of the invention, this reversing action is augmented by the paddles 24, thereby further insuring the rapid build-up of the beads in section B to the level 50B and the complete submersion of the flights of screw 8 in this section.

The silicone coating material in the tank 45 is introduced into the trough 30 on the downstream side of the activator supply intermediate the ends of the conveyor section B. As indicated above, the beads are undergoing violent agitation as they are advanced through section B. The coating material is thoroughly dispersed throughout these beads and reacts with the activator to form a uniform and complete moisture-proof coating on each bead.

Throughout the passage of the glass beads through conveyor section B, the agitation created by the mixing bars 20, the openings 22 and the paddles 24 prevents the agglomeration of the beads which might otherwise occur upon the wetting thereof by the curing and moisture-proofing agents. This agitation is continued subsequent to the addition of the coating material until the beads pass from conveyor section B into conveyor section C, at which time the agitation is substantially reduced and the rate of movement of the beads is increased. As the beads proceed through section C, their level in the trough 30 gradually decreases until they again reach their original level. In FIGURE 1, the level of the beads in section C is indicated by the dotted line 50C. The fully coated, moisture-proof beads are discharged from the outfeed end of section C into a conduit 52 leading to the bin 7 or to other suitable receiving means.

In the moisture-proofing of glass beads or other discrete particles by the use of silicone compounds and curing agents therefor, the quantity of water in the system, introduced as a solvent for the curing agent, advantageously is carefully controlled. If an excess of water is present at the time the coating material is applied, the coated beads will have an excess of unreacted moisture. If there is an insufficient amount of water, the reaction between the activator and the silicone material will not be complete and the coating on the beads will not be uniform. Since different activators and silicones having different molecular weights may be employed, different amounts of water in the activator solution may be used for satisfactory results. For a given activator and coating material, however, the quantity of water which is present in the solution upon the application of the coating material preferably is maintained relatively uniform, and water gains and losses by virtue of variations in atmospheric humidity and evaporation rates are reduced to a minimum during the coating operation. The violent agitation of the beads normally would exhibit a tendency to reduce the amount of water in the system by increasing the rate at which evaporation takes place However, as indicated heretofore, in the illustrated embodiment of the invention, the level 50B of the beads passing through the conveyor section B advantageously is such that the flights of the screw 8 in this conveyor section are completely submerged As a result, at least a major portion of the agitation of the beads takes place beneath the surface of the mass of beads in section B, thereby substantially reducing the evaporation of the water in the activator solution as the beads are advanced along this section toward the coating material supply In addition, the submersion of these screw flights substantially eliminates the adverse effects of churning and cavitation as the beads pass through section B In other embodiments, particularly in cases where the coating material is introduced at a point relatively close to the activator supply, the level of the mass of beads in section B may be such that the screw flights in this section are partially exposed.

In the position shown in FIGURE 1, the particular point in section B at which the coating material is introduced is spaced on the downstream side of the point at which the activator solution is inserted by a distance which illustratively is equal to about three times the diameter of the screw 8. In accordance with many advantageous embodiments of the invention, particularly in localities which are subject to wide variations in atmospheric humidity, the distance between these points is adjusted to insure that the amount of water in the activator solution at the time the coating material is introduced remains relatively uniform. To facilitate this adjustment, the flexible hose 48 for the coating material is affixed to a suitable plug 55 which is sildably disposed in an elongated, longitudinally extending slot 56 in the trough cover 34. In cases in which the atmospheric humidity is relatively low and the rate of evaporation of the water in the activator solution is increased, the plug 55 is moved closer to the hose 43 for the activator solution to thereby reduce the amount of time between the application of the activator and the coating material and insure that quantity of water reaching the coating material supply remains the same. Conversely, under high humidity conditions in which the rate of evaporation is reduced, the plug 55 for the coating material hose 48 is moved further away from the activator hose 43, to increase the amount of time between the application of these materials.

As an illustration, in one installation a conveyor having a twelve inch diameter screw of the type shown in the drawings was operated under approximately forty percent humidity conditions at a speed such that the beads were discharged from the outfeed end of the trough at the rate of 100 pounds per minute. By spacing the activator and coating material hoses thirty-six inches apart, the discharged beads were completely dry and included a uniform, moisture-proof coating thereon. In another installation in which the atmospheric humidity averaged around five percent, the spacing between the activator and coating material hoses was reduced to thirteen inches, again with good results. Of course, these installations are but illustrative, and various other spacings, screw diameters, feed rates, etc., may be employed without departing from the spirit and scope of the invention.

In the illustrated embodiment of the invention, the disposition of the trough 30 is substantially horizontal. In other good embodiments, the trough is inclined upwardly at a slight angle to thereby increase the reversing action of the mixing bars 20 and the paddles 24 in conveyor section B and thereby further reduce the overall efficiency of the portion of the screw in this section.

As indicated heretofore, the silicone coating material advantageously is cured at room temperature by means of an aqueous activator solution. In some cases, however, the silicone may be cured through the application of heat thereto on the downstream side of the coating material supply.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. A method for coating discrete particles while advancing the same along a feed path, comprising continuously feeding a mass of the particles to be coated along said path under controlled humidity conditions, increasing the depth of the particle mass as it is fed along a portion of said path, agitating said particles as they are advanced along said path portion at said increased depth, applying first an aqueous activator solution and then a silicone material to said particles during the agitation thereof, and varying the time between the application of said solution to the agitated particles and the application of said material thereto in accordance with changes in atmospheric humidity, said solution reacting with said material so as to form a uniform coating on each of said particles.

2. A method for coating discrete particles while advancing the same along a feed path, comprising continuously feeding a mass of the particles to be coated along said path under controlled humidity conditions, raising the level of the particle mass as it is fed along a portion of said path, agitating said particles as they are advanced along said path at said raised level, the agitation of said particles taking place primarily within the mass of particles beneath said level and only incidentally at said level, applying an aqueous activator solution to said particles at a first point along said path, then applying a silicone material to said particles at a subsequent point along said path, said activator reacting with said material so as to form a uniform coating on each of said particles, and varying the distance along said path between said first point and said subsequent point in accordance with changes in atmospheric humidity, to similarly vary the time between the application of said activator to said particles and the application of said silicone material thereto.

3. A method for moisture-proofing glass beads while advancing the same along a feed path, comprising continuously advancing a mass of glass beads along a substantially straight feed path under controlled humidity conditions, reducing the rate of movement of said beads as they are fed along a portion of said path to thereby raise the level of the particle mass, violently agitating said beads only during the time they are advanced along said path portion at said raised level, applying an equeous activator solution to said beads at a first point along said path, thereafter applying a silicone material to said beads at a second point along said path, said activator solution reacting with said silicone material so as to cause the hardening thereof and render said beads resistant to moisture, and varying the distance along said path between said first point and said second point in accordance with changes in atmospheric humidity, to similarly vary the time between the application of said activator solution to said beads and the application of said silicone material thereto.

4. A method for coating discrete particles while advancing the same along a feed path, comprising continuously feeding a mass of the particles to be coated along said path, increasing the depth of the particle mass as it is fed along a portion of said path, applying an aqueous activator solution to said particles, agitating said particles as they are advanced along said path at said increased depth, the agitation of said particles taking place primarily beneath the surface level to thereby maintain the evaporation of water in said solution at a minimum during said agitation, of said mass and only incidentally at said level, thereafter adding a silicone material to said mass, and continuing said agitation during the addition of said silicone material to apply said material to each of said particles, said activator solution reacting with said material so as to form a uniform coating on each said particle.

5. A method as defined in claim 4 which includes adding an activator to said particles at room temperature to effect the curing of said silicone material.

6. A method for coating discrete particles while advancing the same along a feed path, comprising continuously feeding a mass of the particles to be coated along said path, increasing the depth of the particle mass as it is fed along a portion of said path, applying an aqueous activator solution to said particles at a first point along said path, agitating said particles as they are advanced along said path, to thereby evenly distribute said activator throughout said particle mass, thereafter adding a silicone material to said mass at a subsequent point along said path, continuing the agitation of said particles during the addition of said silicone material to apply said material to each of said particles, said activator reacting with said material so as to form a uniform coating on each said particle, and varying the distance along said path between said first point and said subsequent point in accordance with changes in atmospheric humidity, to similarly vary the time between the application of said activator solution to said particles and the application of said silicone material thereto.

7. A method for moisture-proofing discrete particles while advancing the same along a feed path, comprising continuously feeding a mass of said particles along said path, reducing the rate of movement of the particle mass as it is fed along a portion of said path to thereby increase the depth of said mass, agitating said particles as they are advanced along said path at said increased depth, the agitation of said particles taking place primarily beneath the surface level of said mass and only incidentally at said level, applying an aqueous activator solution to said particles during the agitation thereof as they move past a first point along said path, said agitation evenly distributing said activator throughout said particle mass, thereafter adding a silicone material to said mass as the particles move past a subsequent point along said path, continuing said agitation during the addition of said silicone material to apply said material to each of said particles, said activator reacting with said material so as to cause the hardening thereof and render said particles resistant to moisture, and varying the distance along said path between said first point and said subsequent point in accordance with changes in atmospheric humidity, to similarly vary the time between the application of said activator solution to said particles and the application of said silicone material thereto.

8. A method for moisture-proofing discrete particles while advancing the same along a feed path, comprising continuously feeding a mass of said particles along an elongated trough defining said feed path, reducing the rate of movement of the particles as they are fed along a portion of said trough to thereby increase the depth of the particle mass therein, applying an aqueous activator solution to said particles, agitating said particles while they are advanced at said reduced rate, the agitation of said particles taking place primarily beneath the surface level of said mass and only incidentally at said level, to thereby maintain the evaporation of water in said solution at a minimum during said agitation, thereafter adding a silicone material to said particles, and continuing said agitation during the addition of said material to uniformly coat each of said particles therewith, said activator solution reacting with said material so as to cause the hardening thereof and render said particles resistant to moisture.

9. A method for moisture-proofing glass beads while advancing the same along a substantially horizontal feed path, comprising feeding path to continuously feed a mass of said beads along said substantially horizontal path, reducing the rate of movement of the beads as they are fed along a portion of said path to thereby build up the bead mass as it enters said portion to a raised level, applying an aqueous activator solution to said beads at a first point along said path as they are advanced at said reduced rate, agitating said beads while they are advanced at said rate to evenly distribute said solution throughout said bead mass, the agitation of said beads taking place primarily within the mass of beads beneath said raised level and only incidentally at said level, to thereby maintain the evaporation of water in said solution at a minimum during said agitation, thereafter adding a silicone material to said beads at a second point along said path, and continuing said agitation during the addition of said silicone material to uniformly apply said material to each of said beads, said activator solution reacting with said silicone material so as to cause the hardening thereof and render said beads resistant to moisture.

10. A method as defined in claim 9 in which the spacing along said path between said first point and said second point is adjustable in accordance with changes in atmospheric humidity, to similarly adjust the time between the application of said activator solution to said beads and the application of said silicone material thereto.

11. In an apparatus for coating discrete particles while advancing the same along a feed path, in combination, an elongated trough defining said feed path and including a mass of the particles to be coated therein, a helix rotatably disposed within said trough, means for rotating said helix to continuously feed said particles along said trough under controlled humidity conditions, a supply of coating material, means for applying said material to said particle mass during the advance thereof, and means for increasing the depth of the particle mass as it is fed along said path by a portion of said helix to a level above the flights thereof, to completely submerge the same, and for simultaneously agitating said particles, the agitation of said particles taking place primarily within the mass of particles beneath the surface level thereof and only incidentally at said level, to thereby uniformly apply said coating material to each of said particles.

12. In an apparatus for coating discrete particles while advancing the same along a feed path, in combination, an elongated trough defining said feed path and including a mass of the particles to be coated therein, a helix having a plurality of flights rotatably disposed within said trough and including a first section and a second section in axial alignment with each other, means for rotating said helix to continuously feed said particles along said trough, a supply of coating material, means for applying said material to the particle mass advancing along said trough, and means including a mixing bar connecting the opposed faces of each pair of adjacent flights in the second section of said helix for increasing the depth of said particle mass as it is fed along said path by said second section to a level above the flights thereof, to completely submerge the same, and for simultaneously agitating said particles, to thereby uniformly apply said coating material to each of said particles.

13. In an apparatus for moisture-proofing glass beads while advancing the same along a feed path, in combination, an elongated, substantially horizontal trough defining said feed path, infeed means for introducing a mass of glass beads into one end of said trough, a helix having a plurality of flights rotatably disposed within said trough and including an infeed section, a second section and an outfeed section positioned along said path in axial alignment with each other, the flights in said infeed and outfeed sections having smooth continuous faces while the flights in said second section each having a plurality of openings therein so as to provide a discontinuous face, means for rotating said helix to continuously feed said beads along said trough, a supply of silicone material, an aqueous activator solution for said material, means for applying said activator solution to said beads at a first point along said path as they are advanced by said second section of said helix, means for thereafter applying said silicone material to said beads at a subsequent point along said path as they are advanced by said second helix section, means including a series of paddles extending from each of said openings and a mixing bar connecting the opposed faces of each pair of adjacent flights in said second section for reducing the rate of movement of said beads along said path as they are advanced by said second section, to raise the surface level of the mass of beads above the flights in said second section and thereby completely submerge the same, said paddles and said mixing bars simultaneously agitating said beads to uniformly apply said silicone material thereto and render said particles resistant to moisture, and means for varying the distance along said second section between said first point and said subsequent point in accordance with changes in atmospheric humidity, to similarly vary the time between the application of said activator solution to said beads and the application of said silicone material thereto.

14. In an apparatus for coating discrete particles while advancing the same along a feed path, in combination, an elongated trough defining said feed path, infeed means for introducing a mass of the particles to be coated into one end of said trough, a helix having a plurality of flights rotatably disposed within said trough and including a first section and a second section in axial alignment with each other, means for rotating said helix to continuously feed said particles along said trough, a supply of coating material, means for applying said material to the particle mass advancing along said trough, and means for raising said particle mass as it is advanced along said path by the second section of said helix to a level above the flights thereof, to completely submerge the same, and for simultaneously agitating said particles, to thereby uniformly apply said coating material thereto, said last mentioned means including paddle means extending from each of the flights in said second helix section and a mixing bar connecting the opposed faces of each pair of adjacent flights in said second section.

15. In an apparatus for moisture-proofing discrete particles while advancing the same along a feed path, in combination, an elongated, substantially horizontal trough defining said feed path, infeed means for introducing a mass of said particles into one end of said trough, a helix having a plurality of flights rotatably disposed within said trough and including an infeed section and a second section in axial alignment with each other, the flights in said second helix section each having a plurality of openings therein so as to provide a discontinuous face thereon, means for rotating said helix at a uniform speed to continuously feed said particles along said trough, a supply of coating material, means for applying said material to the particle mass advancing along said trough, and means for reducing the rate of movement of said particles as they are advanced along said path by the second section of said helix to raise the level of the particle mass therein above the flights of said second section, to completely submerge the same, and for simultaneously agitating said particles, to uniformly apply said coating material thereto and render said particles resistant to moisture, said last mentioned means including paddle means extending from each said opening and a mixing bar connecting the opposed faces of each pair of adjacent flights in said second helix section.

16. In an apparatus for moisture-proofing discrete particles while advancing the same along a feed path, in combination, an elongated, substantially horizontal trough defining said feed path, infeed means for introducing a mass of said particles into one end of said trough, a helix having a plurality of flights rotatably disposed within said trough and including an infeed section, a second section and an outfeed section positioned in that order along said path, the flights in said infeed and outfeed sections having smooth continuous faces thereon while the flights in said second section each having a plurality of openings therein so as to provide a discontinuous face thereon, means for rotating said helix to continuously feed said particles along said trough, a supply of coating material, means for applying said material to the particle mass as it is advanced by the second section of said helix, and means for reducing the rate of movement of said particles as they are advanced along said path by said second helix section to raise the level of the particle mass therein above the flights of said second section, to completely submerge the same, and for simultaneosuly agitating said particles, to uniformly apply said coating material thereto and render said particles resistant to moisture, said last mentioned means including paddle means extending from each said opening and a mixing bar connecting the opposed faces of each pair of adjacent flights in said second section.

17. An apparatus of the character set forth in claim 16 in which said paddle means and said mixing bars meet the surfaces of the flights there adjacent at right angles.

References Cited in the file of this patent

UNITED STATES PATENTS

| | | |
|---|---|---|
| 1,370,764 | Popkess | May 14, 1917 |
| 2,386,259 | Norton | Oct. 9, 1945 |
| 2,538,891 | Zimmerman et al. | Jan. 23, 1951 |
| 2,730,841 | Sealright | Jan. 17, 1956 |
| 2,860,598 | Toesche | Nov. 18, 1958 |
| 2,878,111 | Daniels | Mar. 17, 1959 |
| 2,882,505 | Feder | Apr. 14, 1959 |

FOREIGN PATENTS

| | | |
|---|---|---|
| 520,966 | Great Britain | May 8, 1940 |

UNITED STATES PATENT OFFICE
CERTIFICATE OF CORRECTION

Patent No. 3,130,070 April 21, 1964

Robert Potters et al.

It is hereby certified that error appears in the above numbered patent requiring correction and that the said Letters Patent should read as corrected below.

Column 1, line 47, for "materials" read -- material --; column 5, line 72, for "sildably" read -- slidably --; column 7, line 17, for "equeous" read -- aqueous --; line 38, strike out "of said mass and only incidentally at said level," and insert the same after "level" in line 36, same column 7; column 8, line 37, strike out "path to continuously feed"; column 10, line 68, for "Sealright" read -- Searight --.

Signed and sealed this 18th day of August 1964.

(SEAL)
Attest:

ERNEST W. SWIDER
Attesting Officer

EDWARD J. BRENNER
Commissioner of Patents